March 11, 1941.  H. H. FREEMAN  2,234,629
OSCILLATING HINGE ATTACHMENT FOR CONNECTING BIN FRAMES TO COMBINES
Filed Oct. 18, 1939  3 Sheets-Sheet 1
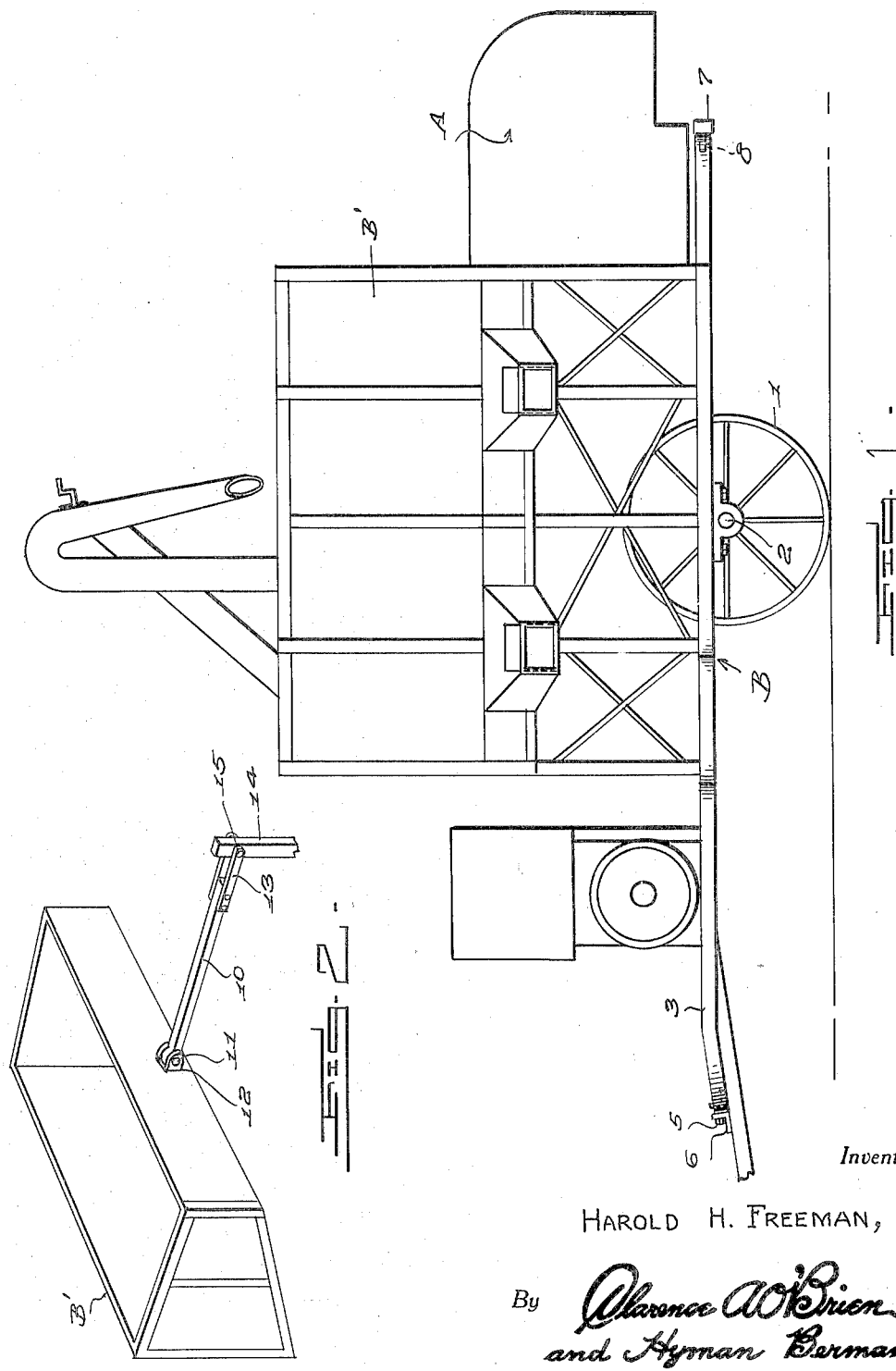
Inventor
HAROLD H. FREEMAN,
By Clarence A. O'Brien
and Hyman Berman
Attorneys

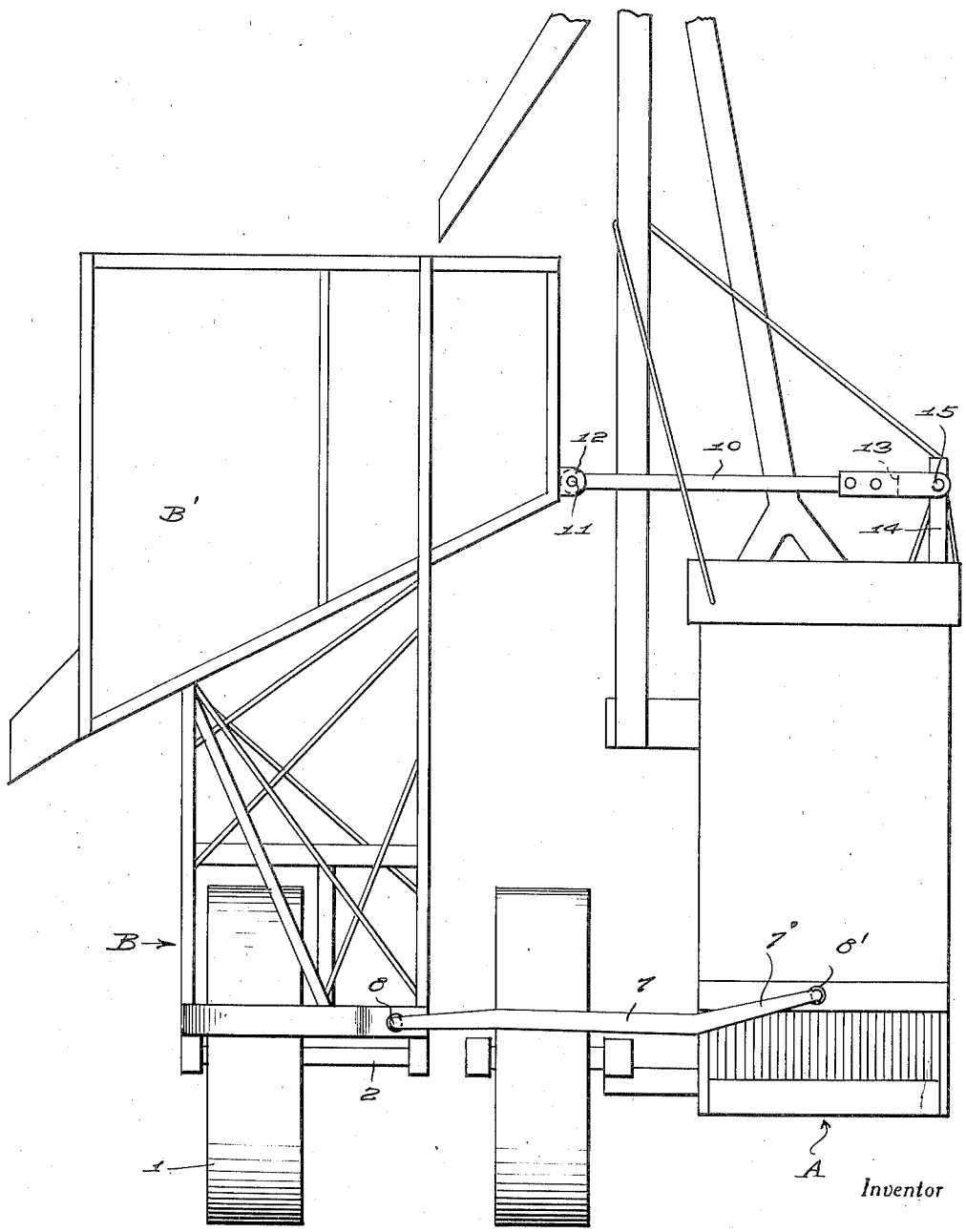

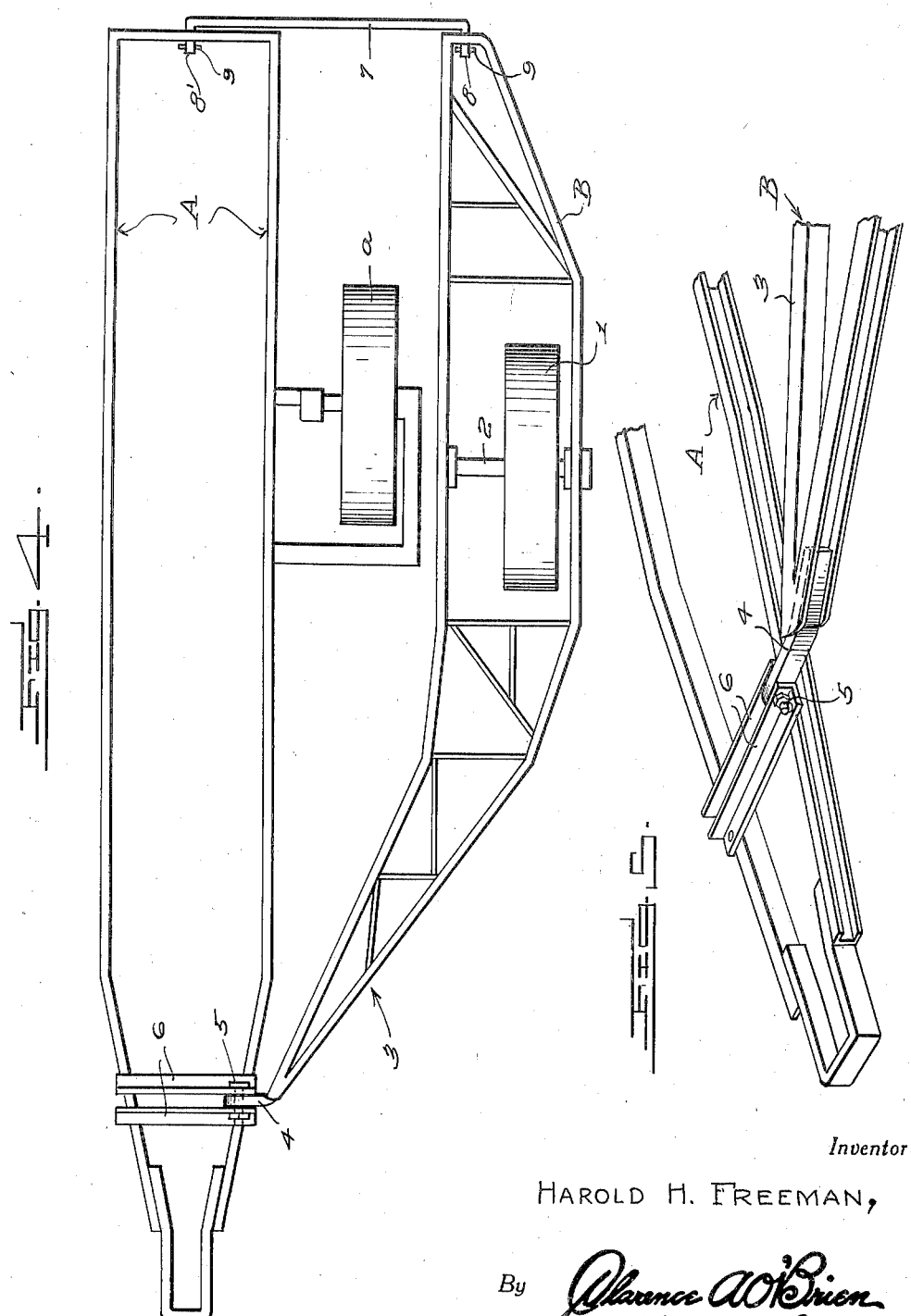

Patented Mar. 11, 1941

2,234,629

UNITED STATES PATENT OFFICE 2,234,629

OSCILLATING HINGE ATTACHMENT FOR CONNECTING BIN FRAMES TO COMBINES

Harold H. Freeman, Ririe, Idaho

Application October 18, 1939, Serial No. 300,055

3 Claims. (Cl. 56—122)

This invention relates to means for connecting the frame of a grain receiving bin of a combine to the frame of a combine so that the bin frame will ride smoothly at the side of the combine and not be pitched up and down or sidewise with the tilting or rocking of the combine.

The general object of the invention is to provide a frame on which the grain receiving bin is located, the frame being provided with a substantially centrally arranged wheel and means for so pivotally connecting the frame to the frame of the combine that the bin frame will have movement independent of the rocking movement of the combine so as to prevent the bin frame from being pitched up and down or sidewise as the combine tilts or rocks, particularly in passing over rough ground or when used in hilly country.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which—

Figure 1 is an elevational view of the bin frame with parts of the combine.

Figure 2 is a perspective view showing how the inner side of the bin is connected to an upright of the combine.

Figure 3 is a rear view of parts of a combine showing how the bin frame is connected to the combine.

Figure 4 is a top plan view showing how the bin frame is connected with the combine frame, this view being largely diagrammatic.

Figure 5 is a perspective front view showing how the front of the bin frame is pivotally connected with the front part of the combine frame.

In these drawings the letter A indicates a portion of the combine frame and one of the wheels of which is shown at $a$ and certain other portions of the combine are shown in Figures 1 and 3 but it is not thought necessary to indicate these parts as, of course, they form no portion of the invention. The frame of the bin is shown at B and the bin itself is shown at B' and is suitably supported at the top of the frame and a wheel 1 is carried by a transverse axle 2 supported in the lower part of the frame B adjacent the center thereof so that the bin and its frame is mainly supported by this wheel 1. At the front the frame B has a reduced part 3 which extends forwardly and sidewise toward the front end of the combine and a bar 4 is connected to the front end of this part 3 and extends practically at right angles to the length of the frames and is pivoted by a bolt or pin 5 between a pair of angle bars 6 attached to the front end of the frame A as shown more particularly in Figure 5, the pivot pin or bolt 5 extending longitudinally of the frame A. A transversely arranged bar 7 pivotally connects the rear end of the frame B with the rear end of the frame A and this bar 7 has its ends bent forwardly as shown at 8 and 8' and one of these ends 8 passes through a hole in the rear end of the frame B and the other end 8' passes through a hole in the rear end of the frame A, suitable means such as the pins 9 removably holding the said ends 8 and 8' in the holes. As shown in Figure 3 the inner end of the bar 7 slopes upwardly and toward the frame A, as shown at 7'. This specific form of bar 7 and the means for connecting it to the rear ends of the frames A and B permits relative movement of the frames as the wheels pass over hilly or rough ground.

A bar 10 is pivotally connected to the inner wall of the bin B' by means of the horizontally arranged pin 11 passing through ears 12 on said wall and through an eye or hole in the bar 10. A pair of straps 13 are fastened to the other or inner end of the bar 10 and these straps are pivoted one on each side of an upright or post 14 rising from a part of the combine, as shown at 15.

Thus it will be seen that the bin carrying frame is supported by a large ground engaging wheel 1 and it is connected at the front and rear by pivotal means and at the top adjacent the center by pivotal means which permits relative movement of the combine frame and the bin frame which permits the bin and its frame to travel along at one side of the combine in a smooth manner and without being tossed about by movement of the combine as the parts travel over hilly country or rough ground. Also, the bin will carry a greater load than will the bin as now attached to combines and has considerably less danger of the breaking of the frame bars when the combine is used on rough ground.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. In combination with a combine and its bin, a frame carrying the bin, a wheel supporting the frame, a bar at the front of the bin frame, said bar extending at substantially right angles to the length of the frame, means pivotally connecting said bar to a part of the combine at the front thereof, a rear bar having its end parts bent at substantially right angles, one end part being pivotally connected with the rear end of the bin frame and the other end part pivotally connected with the rear end of the combine, a top bar having one end pivotally connected with an upper portion of the bin and means pivotally connecting the other end of said bar to an upper part of the combine.

2. In combination with a combine and its bin, a frame carrying the bin, a wheel supporting the frame, a bar at the front of the bin frame, said bar extending substantially at right angles to the length of the frame, means pivotally connecting said bar to a part of the combine at the front thereof, a rear bar having its end parts bent at substantially right angles, one end part being pivotally connected with the rear end of the bin frame and the other end part pivotally connected with the rear end of the combine, a top bar having one end pivotally connected with the upper portion of the bin and means pivotally connecting the other end of said bar to an upper part of the combine, the pivotal parts of the last-mentioned bar extending longitudinally of the frames.

3. In combination with a combine, a bin carrying frame, a wheel connected with the frame adjacent the center thereof for supporting the frame and the bin, said frame having a front part extending toward the combine and terminating in a part arranged at substantially right angles to the length of the frame, means for pivotally connecting said part to the combine movement about a horizontal axis which extends longitudinally with respect to the length of the combine, a rear bar, means connecting one end of the bar to the rear end of the combine for movement about a horizontal longitudinally extending axis, means connecting the other end of the bar to the rear end of the frame for movement about a horizontal longitudinally extending axis, a top bar connecting an upper portion of the frame to a part of the combine, said top bar being connected to each of the frame and the combine by horizontal longitudinally extending pivots.

HAROLD H. FREEMAN.